(No Model.) 2 Sheets—Sheet 2.

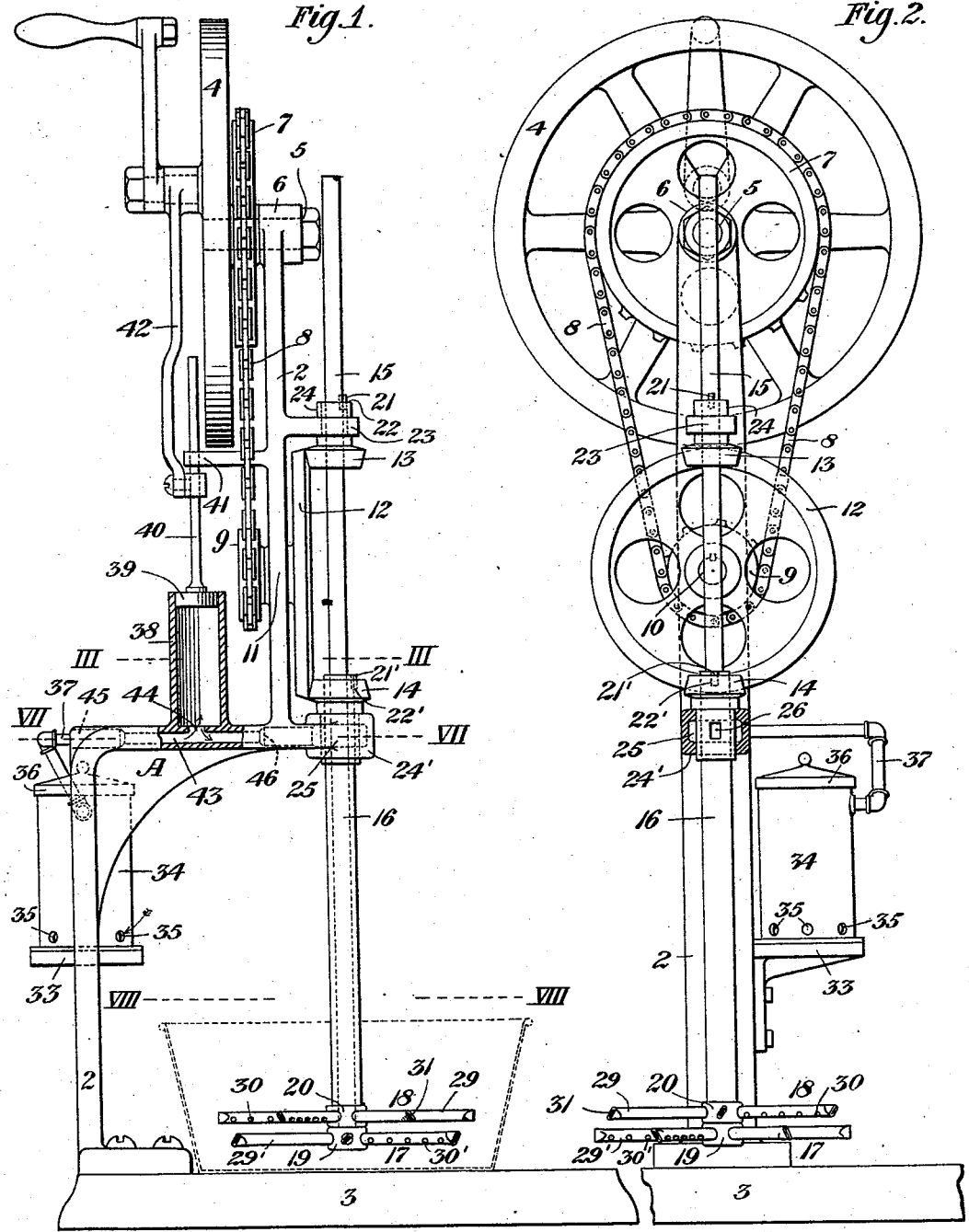

J. V. EBEL.
EGG BEATER.

No. 536,136. Patented Mar. 19, 1895.

WITNESSES:
Philip Y. Pendleton
O. M. Clarke

INVENTOR,
John V. Ebel

UNITED STATES PATENT OFFICE.

JOHN V. EBEL, OF PITTSBURG, PENNSYLVANIA, ASSIGNOR OF TWO-THIRDS TO GEORGE E. LORCH AND LOUIS LORCH, JR., OF SAME PLACE.

EGG-BEATER.

SPECIFICATION forming part of Letters Patent No. 536,136, dated March 19, 1895.

Application filed March 12, 1894. Serial No. 503,233. (No model.)

*To all whom it may concern:*

Be it known that I, JOHN V. EBEL, a citizen of the United States, residing at Pittsburg, in the county of Allegheny and State of Pennsylvania, have invented or discovered a new and useful Improvement in Egg-Beaters, of which the following is a full, clear, and exact description, reference being had to the accompanying drawings, forming part of this specification, in which—

Figure 7:
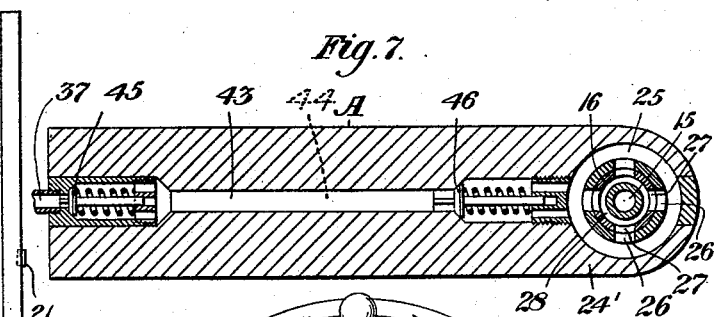
Figures 5, 6:
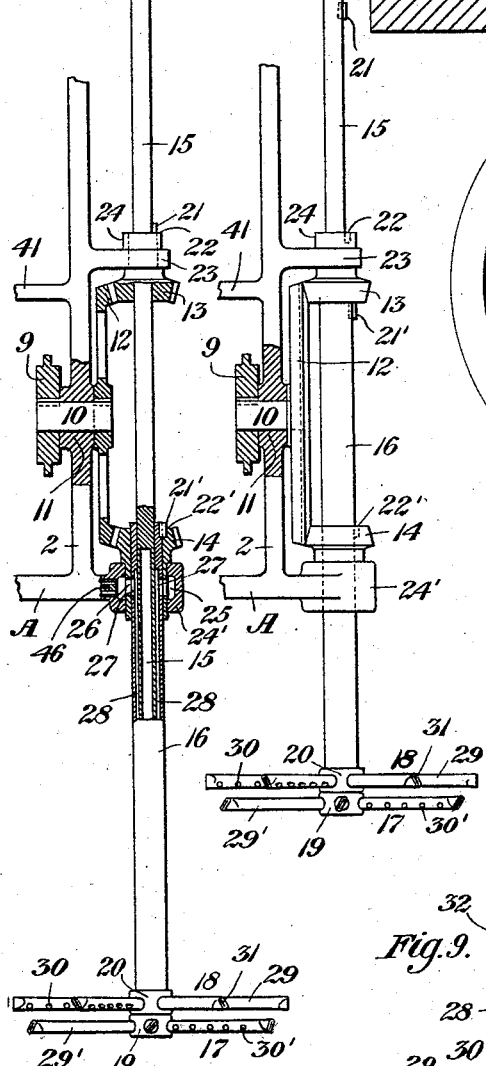
Figure 4:
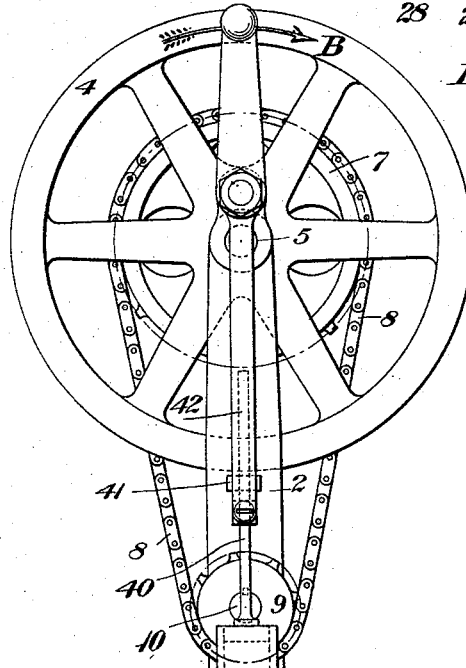
Figure 9:
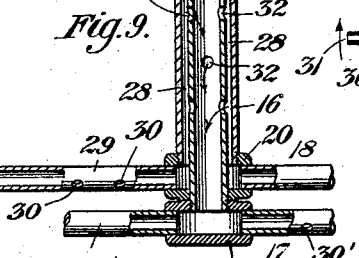
Figure 8:
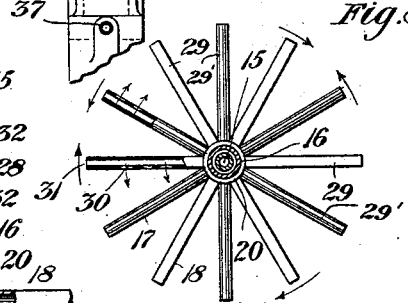

Figure 1 is a side elevation of my improved egg beater, partly broken away, showing the pump cylinder and parts of the air passages in section. Fig. 2 is a front elevation, showing the lower bearing for the beater shafts in section. Fig. 3 is a horizontal cross section taken on the line III III of Fig. 1. Fig. 4 is a partial back elevation, similar to Fig. 2, showing the crank arm and connection to the piston rod of the pump cylinder. Figs. 5 and 6 are partial views in elevation, similar to Fig. 1, showing the beaters in a lowered and raised position respectively and illustrating the means for driving and supplying air to them, and certain other features of construction in detail. Fig. 7 is a horizontal cross section, on an enlarged scale, taken on the line VII VII of Fig. 1. Fig. 8 is a plan view of the beaters, showing the shafts or stems in section, the section being taken on the line VIII VIII of Fig. 1. Fig. 9 is a vertical section, on an enlarged scale of the lower ends of the shafts or stems, illustrating the attachment of the beater arms, and the circulation of air thereto.

Similar numerals of reference refer to like parts wherever used throughout this specification.

My invention consists in an improvement in machinery for beating eggs, whereby the desired result is accomplished in a much more rapid and efficient manner than has been possible heretofore. My machine is designed for the purpose of beating large quantities of eggs, and comprises essentially two sets of beater arms, designed to revolve in a horizontal plane in close proximity to one another, near to the bottom of the pan; also in means whereby the hollow shafts or spindles are caused to revolve in opposite directions, together with mechanism for forcing a current of previously cooled air down through the spindles and out through perforations in the beater arms, and means for previously cooling the air. It comprises further features of construction and adjustment which will be described hereinafter.

Referring now to the drawings, 2 is the upright standard or frame, rigidly bolted to the base 3, and supporting at its upper end the crank wheel 4, mounted on the shaft 5, which has a journal bearing 6.

7 is a sprocket wheel, also mounted on the shaft 5, connected by the chain 8 with the smaller sprocket wheel 9 mounted on the shaft 10, journaled in the main upright at 11, and having keyed or otherwise secured to it the larger bevel wheel 12. This wheel is in mesh with the two small bevel wheels 13 and 14, which are removably keyed to the inner spindle 15 and outer spindle 16 respectively, carrying on their lower ends the two sets of beater arms 17 and 18, attached at their inner ends to the hollow hubs 19 and 20, as shown in Fig. 9. As shown in Figs. 5 and 9, both the spindles are made hollow for the purpose, as already stated, of supplying air to the beater arms, the inner spindle 15 passing down through the outer spindle 16 and itself being hollow for a little less than half its length. The bevel wheels 13 and 14, have extension hubs which inclose the inner and outer spindles respectively, and in which they are free to move vertically, this provision being for the purpose of raising the beater arms into the position shown in Fig. 6, for the removal or insertion of the pan shown in dotted lines in Fig. 1. Keys 21 and 21' are permanently secured to the spindles, and when in a lowered or operative position, illustrated in Figs. 1 and 5, these keys fall into register with corresponding sockets 22 and 22', in the extension hubs of the bevel wheels. The upper bevel wheel hub extension is fitted into a bearing 23, extending outwardly from the main upright, and provided with a retaining collar 24, while the lower bevel wheel hub extension has a bearing in a similar extension 24', but which is provided with an internal annular chamber 25, to which air is furnished from the pump cylinder, and from which it communicates through ports 26 in the hub extension, (held integral with the spindle 16 by the key 21') and through ports 27 in the spindle 16, and thence downwardly through the annular space 28, into the interior of the hollow hub 20, and thence outwardly through the hollow beater arms 29 and through perforations 30 and end orifice 31. The perforations 30 are located along the lower back portion of the arms 29, so that when they are revolving as shown by the arrows in Fig. 8, the air will escape outwardly and backwardly and the openings will not be liable to be filled up or clogged, as they would should the direction be reversed; and for the guidance of the operator the arrow B is placed on the crank wheel 4. As already stated, the lower part of the spindle 15 is also hollow, and provided with perforations 32, giving air communication from annular chamber 28, to its interior and finally to the hollow hub 19, similarly provided with hollow beater arms 29' and perforations 30', and in other respects similar to the beater arms secured to the hub 20, except that the perforations are located on the opposite side, in order to be on the back of the arms in their reverse revolution. It will be seen that the upper hub 20 rests upon the lower hub 19, so that when the inner spindle 15 is raised, as in Fig. 6, it will raise with it the upper hub 20, and outer spindle 16, thereby disengaging the keys 21 and 21' simultaneously, and allowing them to drop back into their sockets in the same manner.

I will now describe the air cooling and pumping apparatus.

33 is a bracket secured to the main upright of the machine, supporting an ice receptacle 34, provided with air inlet openings 35 at its lower portion, a removable top 36, and an outlet pipe 37 leading to an inlet check valve located at the outer end of a passage in communication with the air pump cylinder 38. This cylinder is preferably cast integral with the upright frame 2, but may be made separate therefrom. It is provided with a plunger 39, stem 40, held in vertical alignment by the bearing 41 and actuated by the revolution of the crank wheel 4, to which it is attached by the same wrist pin that carries the crank handle, through connecting rod 42, adjustably attached to stem 40. Extending longitudinally through the center of the horizontal arm A of the main upright frame 2, is the air channel 43, communicating upwardly with the cylinder 38 through opening 44, having at its outer end the inlet check valve 45 in communication with the pipe 37 leading from the ice receptacle, and having at the other end the outlet check valve 46, in immediate communication with the annular chamber 25 in the bearing 24'. Thus, when the plunger rises in the cylinder, air will be drawn through the check valve 45, from the ice receptacle 34, being cooled in its passage through a mass of cracked ice placed therein, while the check valve 46 will be closed under the action of the spring until the plunger commences to go down, when the valve 45 will be closed and the valve 46 will be opened, allowing the air to enter the chamber 25, from which it will reach the beater arms as already described.

In operation, a substantially continuous current of cold air may be maintained to the beater arms, and its flow may be varied by the rapidity of operation of the machine. When desired, hot water may be introduced into the ice receptacle and forced through the ports and pump and beater arms for the purpose of cleansing them, and I have found this in practice, a very efficient cleansing operation.

The advantages of my improved machine will be appreciated by those skilled in the art. It is very simple and highly efficient in operation; being capable of beating a larger number of eggs in a shorter time and in a more perfect manner than has heretofore been possible, thus saving much time and labor. It is cheap to construct and not liable to get out of order, and may be built of any desired size or capacity, and operated either by hand, or power, if preferred, by the substitution of a pulley for the crank wheel 4.

Having described my invention, what I claim, and desire to secure by Letters Patent, is—

1. In an egg beating machine, the combination of a base, a single standard frame rigidly secured thereto, a receptacle for an air cooling substance mounted on the frame, provided with air inlet ports, a check valve controlled passage leading from it to the air pump, a check valve controlled passage leading from the air pump to an annular chamber surrounding the concentric spindles within their bearings, an air pump with a reciprocating piston and piston rod, a connecting rod attached to the piston rod and to the driving wheel of the machine, a driving wheel mounted on the main frame, carrying on its shaft a driving sprocket wheel, a sprocket chain connecting the driving sprocket wheel with a driven sprocket wheel on the same shaft as the driving bevel wheel, a driving bevel wheel also mounted on the main frame, with two hollow concentric spindles to which are removably keyed two driven bevel gear wheels in mesh with the driving bevel wheel, and provided with hollow hubs and radial hollow perforated beater arms, the concentric spindles having vertical bearings in two extensions of the main frame, the lower bearing being hollow and in communication with the inlet port from the air pump, the spindles being capable of vertical movement, and the inner one being provided with a key registering with a slot in the hub extension of the upper driven bevel wheel, substantially as set forth.

2. In an egg beating machine provided with a base, a single standard frame, a receptacle for an air cooling substance mounted on the frame, an air pump provided with a reciprocating piston and piston rod, a main driving wheel connected by a connecting rod with the pump, mounted on a shaft carrying a sprocket wheel, a sprocket chain connecting said sprocket wheel with a driven sprocket wheel mounted on the same shaft with a driving bevel gear wheel 12, the driven bevel gear wheels 13 and 14 removably keyed to the spindles, the hollow concentric spindles 15 and 16 vertically journaled in bearings 23 and 24' in communication with the air pump 38 and air cooling receptacle 34, the spindles being provided with hollow hubs 19 and 20 hollow radial beater arms 29' and 29 provided with inclined perforations 30' and 30, hub 20 resting on hub 19 substantially as set forth.

3. In an egg beating machine, the hollow concentric spindles 15 and 16, an air pump 38 in communication therewith, the spindles being provided at their bottoms with hollow hubs and radial hollow perforated beater arms, and being mounted in hollow bearings 23 and 24', the bevel wheels 13 and 14, provided with perforated hub extensions and detachably keyed to the spindles by keys 21 and 21' the driving bevel wheel 12, the shaft 10, the sprocket wheel 9 and sprocket chain 8 for transmitting power from the driving sprocket wheel 7, all substantially as set forth.

In testimony whereof I have hereunto set my hand this 28th day of February, 1894.

JOHN V. EBEL.

Witnesses:
PHILIP Y. PENDLETON,
C. M. CLARKE.